US012737145B2

(12) United States Patent
An et al.

(10) Patent No.: US 12,737,145 B2
(45) Date of Patent: Sep. 15, 2026

(54) SEARCHING IMAGE FORMING APPARATUS FOR WORKFLOW EXECUTION

(71) Applicant: Hewlett-Packard Development Company, L.P., Spring, TX (US)

(72) Inventors: Changnam An, Seongnam Si (KR); SungJin Ahn, Seongnam Si (KR); Hyungjong Kang, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 341 days.

(21) Appl. No.: 18/688,623

(22) PCT Filed: Feb. 11, 2022

(86) PCT No.: PCT/US2022/016080
§ 371 (c)(1),
(2) Date: Mar. 1, 2024

(87) PCT Pub. No.: WO2023/038662
PCT Pub. Date: Mar. 16, 2023

(65) Prior Publication Data

US 2024/0378000 A1 Nov. 14, 2024

(30) Foreign Application Priority Data

Sep. 9, 2021 (KR) ........................ 10-2021-0120557

(51) Int. Cl.
*G06F 3/12* (2006.01)

(52) U.S. Cl.
CPC .......... *G06F 3/1226* (2013.01); *G06F 3/1203* (2013.01); *G06F 3/1236* (2013.01); *G06F 3/1238* (2013.01); *G06F 3/1274* (2013.01); *G06F 3/1275* (2013.01); *G06F 3/1288* (2013.01)

(58) Field of Classification Search
CPC .... G06F 3/1226; G06F 3/1203; G06F 3/1236; G06F 3/1238; G06F 3/1274; G06F 3/1275; G06F 3/1288; G06F 3/1292; G06F 3/1204; H04N 2201/0094; H04N 1/00307; H04N 1/00949; H04N 1/00973; H04N 1/32523
See application file for complete search history.

(56) References Cited

U.S. PATENT DOCUMENTS 8,189,225 B1 * 5/2012 Lo ........................ H04L 67/568 358/1.15
2014/0063537 A1 3/2014 Nishikawa et al.
2015/0002892 A1 * 1/2015 Maeda ................. G06F 3/1292 358/1.15
2019/0034456 A1 1/2019 Macciola et al.
2021/0352191 A1 * 11/2021 Heo .................... H04N 1/4433

* cited by examiner

*Primary Examiner* — Christopher Wait
(74) *Attorney, Agent, or Firm* — Foley & Lardner LLP

(57) ABSTRACT

An example method performed at a client device includes generating a workflow based on an input received through a user interface device of the client device, searching for an image forming device capable of performing every work included in the workflow, and transmitting workflow information regarding the workflow to one image forming device of image forming devices found by the searching.

15 Claims, 14 Drawing Sheets

COMPUTER-READABLE RECORDING MEDIUM
1200

INSTRUCTIONS TO GENERATE WORKFLOW BASED ON RECEIVED INPUT
1210

INSTRUCTIONS TO SEARCH FOR IMAGE FORMING DEVICE CAPABALE OF PERFORMING EVERY WORK INCLUDED IN WORKFLOW
1220

INSTRUCTIONS TO TRANSMIT WORKFLOW INFORMATION REGARDING WORKFLOW TO ONE OF IMAGE FORMING DEVICE FOUND BY SEARCH
1230

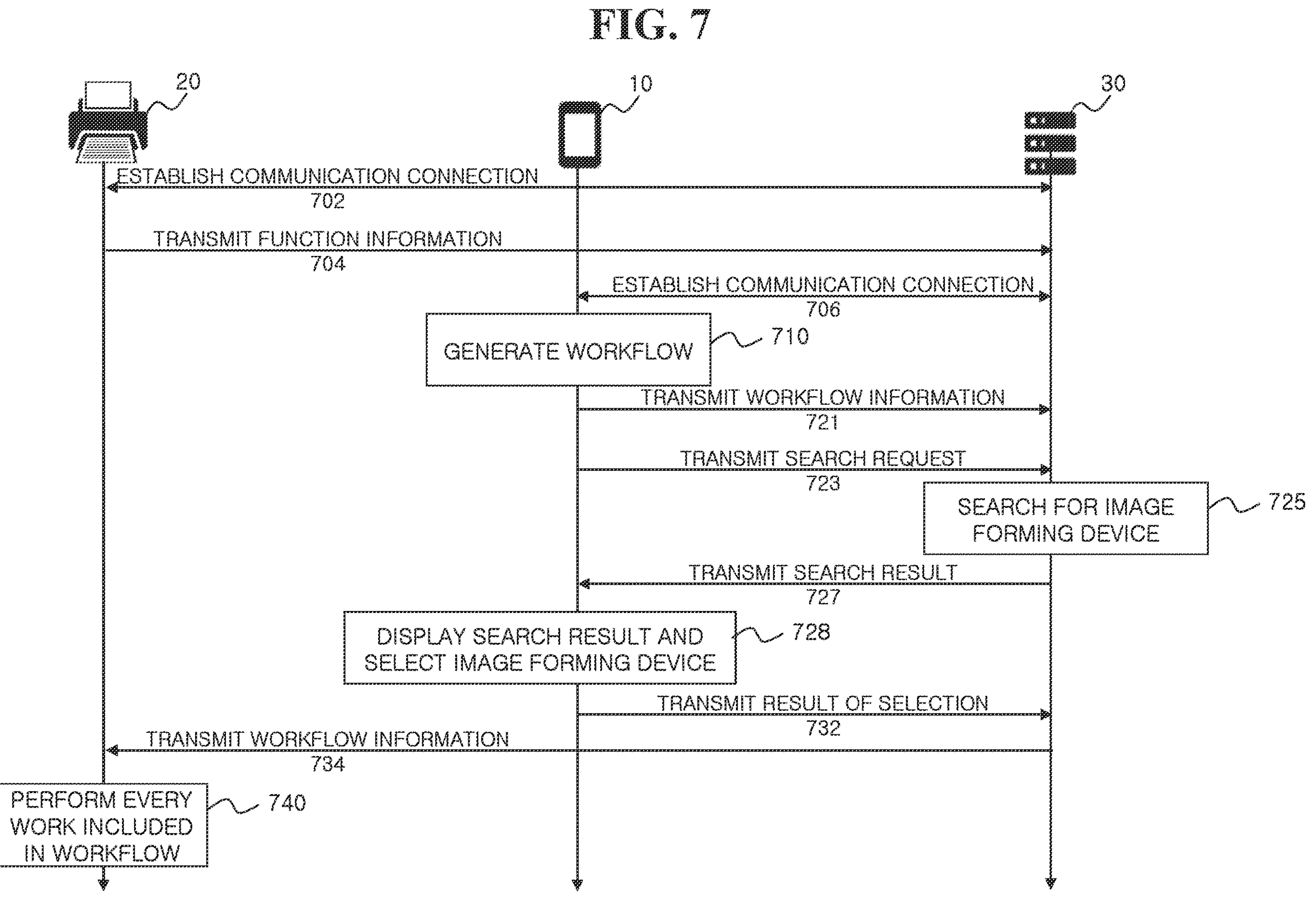
FIG. 7
20
10
30
ESTABLISH COMMUNICATION CONNECTION
702
TRANSMIT FUNCTION INFORMATION
704
ESTABLISH COMMUNICATION CONNECTION
706
GENERATE WORKFLOW
710
TRANSMIT WORKFLOW INFORMATION
721
TRANSMIT SEARCH REQUEST
723
SEARCH FOR IMAGE FORMING DEVICE
725
TRANSMIT SEARCH RESULT
727
DISPLAY SEARCH RESULT AND SELECT IMAGE FORMING DEVICE
728
TRANSMIT RESULT OF SELECTION
732
TRANSMIT WORKFLOW INFORMATION
734
PERFORM EVERY WORK INCLUDED IN WORKFLOW
740

SEARCHING IMAGE FORMING APPARATUS FOR WORKFLOW EXECUTION

BACKGROUND

An image forming apparatus may perform various operations as well as an image forming operation such as printing, copying, scanning, faxing, storage, transmission, coating, etc. Various methods may be used to improve accessibility to the operations performed in the image forming apparatus. For example, a user may access the image forming apparatus through his client apparatus to cause the image forming apparatus to perform a certain operation or may cause the image forming apparatus to perform a certain operation through a server to which the image forming apparatus is connected.

BRIEF DESCRIPTION OF THE DRAWINGS

Various examples will be described below by referring to the following figures.

FIG. 7 is a flowchart illustrating a process of a server searching for an image forming device according to an example.

DETAILED DESCRIPTION

Figure 1:
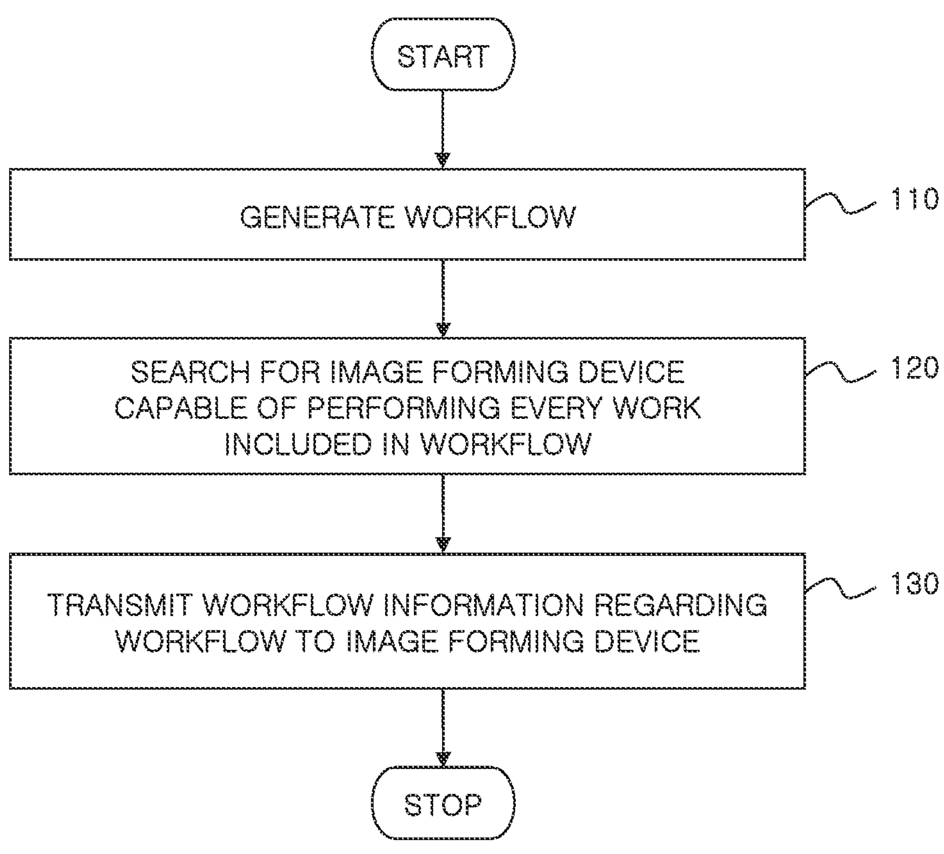
FIG. 1 is a flowchart illustrating a process of causing an image forming device selected at a client device to perform a work according to an example.

A client device may be used to perform various operations at an image forming device. For example, a user may use a short-range communication method to directly connect his client device to the image forming device to use the image forming device. In an example, an image forming device connected to a server may be used through the server.

In a situation in which a plurality of devices exist around a user, the user may desire to use an appropriate image forming device from among the plurality of image forming devices.

Examples of the present disclosure provide a method performed at a client device. The method includes generating a workflow based on an input received through a user interface device of the client device, searching for an image forming device capable of performing every work included in the workflow, and transmitting workflow information regarding the workflow to one image forming device of the image forming devices found by the searching.

Accordingly, a user may select and use an appropriate image forming device from among a plurality of image forming devices. Furthermore, an image forming device suitable for operations to be performed by a user may be selected from among the plurality of image forming devices and used. Furthermore, a user may search for and use a public image forming device while maintaining security.

Hereinafter, examples of the present disclosure will be described with reference to the accompanying drawings. However, the present disclosure may be implemented in various different forms and is not limited to the examples described herein.

Terms including ordinals such as first, second, etc. may be used to identify various components, but the components are not limited by the terms. These terms are used for the purpose of distinguishing one component from another. For example, a first component may be referred to as a second component, a second component may be referred to as a first component, and their ordinal number may be omitted.

A "client device" may refer to a device to receive a user's command and display information processed according to the user's command. The client device may be, for example, an image forming apparatus, a Personal Computer (PC), a tablet PC, a Personal Digital Assistant (PDA), a laptop, a smartphone, a mobile phone, or the like. In the client device, a program related to the operation of the client device or an external apparatus may be installed. The client device may communicate information with an image forming device or a server through a program installed in the client device. The client device may transmit, to the server, information received from the image forming device, and transmit, to the image forming device, information received from the server. For example, a program related to an example operation described below may be installed on the client device.

An "image forming device" may refer to any kind of device capable of performing an image forming operation, such as a printer, a copier, a scanner, a fax machine, a multi-function printer (MFP), a display device, etc. The image forming device may also be a two dimensional (2D) image forming device or a 3D image forming device. An "image forming operation performed by the image forming device" may refer to an operation related to printing, copying, scanning, faxing, storage, transmission, coating, etc., or a combination of two or more of the operations described above.

A "server" may refer to a device to provide a user with a service being associated with an image forming device. The server may correspond to a provider to provide a user with a service being associated with an image forming device. The server may be implemented by a plurality of servers. The plurality of servers may communicate with each other and be distinguished from each other according to a function performed by each server. The server may provide an application program interface (API), such as an API for user registration (e.g., generation of a user account), an API for registration of an image forming device, an API for searching for an image forming device, an API for causing an image forming device to perform an operation, and the like.

The server may create, search, change, delete, or store information or data related to a service which is provided to a user, a client device, an image forming device, etc.

A "work" may refer to an operation performed at an image forming device. The work may include various operations as well as image forming operation such as printing, copying, scanning, faxing, storage, transmission, coating, and the like.

A "workflow" may refer to a flow of operations, such as operations performed at an image forming device. Operations or works included in a workflow may be performed sequentially or in parallel. For example, work 1 is performed and then work 2 is performed, work 1 and work 2 are performed simultaneously, or work 2 is performed and then work 1 is performed. A work may be performed on condition of the completion of another work in a workflow. For example, work 2 may be performed on condition of the completion of work 1, and work 2 may be not started in a case where an error occurs during work 1 or work 1 is otherwise not complete. A work may be performed on condition of the starting of another work in a workflow. For example, work 2 may be started on condition of the starting of work 1, so work 2 may be performed even though an error occurs during work 1 or work 1 is otherwise not complete. A work may be performed based on an output of a previous work in a workflow. For example, work 2 may be performed based on an output of work 1. An image forming device may be implemented to transmit an error message to a user's client device in a case where an error occurs during performing of works included in a workflow at the image forming device. A workflow may be generated at a client device, examples of which are explained by referring to FIGS. 1, 2A, and 2B.

FIG. 1 is a flowchart illustrating a process of causing an image forming device selected at a client device to perform a work according to an example.

A process performed at the client device may be performed through an application installed on the client device.

At operation 110, a workflow may be generated. The client device may generate the workflow based on an input received through a user interface of the client device. The workflow may include a series of works performed at an image forming device. For example, a workflow including a work to scan a document, a work to create a copy of a scanned document, and a work to upload a scanned document to a cloud storage may be generated at the client device by a user in order for an image forming device to scan a document, create a copy of a scanned document, and upload a scanned document to a cloud storage. A workflow is not limited to the above-described works, and various workflows of an image forming device may be generated in a client device. A workflow generated at the client device may be stored in the client device as workflow information, but is not limited thereto, and may be stored in various locations. For example, the workflow information may be stored or backed up in a server to which the client device is connected. The workflow information may be stored in an image forming device connected to the client device. The workflow information may be stored temporarily while a work corresponding to the workflow information is performed at an image forming device.

At operation 120, a search is conducted for an image forming device that is capable of performing every work included in the workflow. For example, in a case where a workflow including a work to scan a document, a work to create a copy of a scanned document, and a work to upload a scanned document to a cloud storage is generated, the client device may search for an image forming device capable of scanning a document, creating a copy of a scanned document, and uploading a scanned document to a cloud storage. An example process in which the client device searches for an image forming device capable of performing every work included in a workflow will be explained later by referring to FIGS. 3, 6, and 7.

At operation 130, workflow information regarding the workflow may be transmitted to an image forming device. For example, the client device may transmit, to an image forming device found by the searching, the workflow information regarding the workflow generated at operation 110. For example, the client device may transmit, to an image forming device selected by a user among the found image forming devices, the workflow information regarding the workflow generated at operation 110. For example, the client device may transmit, to a plurality of image forming devices found by the searching or those selected by a user among the found plurality image forming devices, the workflow information regarding the workflow generated at operation 110.

The image forming device may perform every work defined by the workflow information based on receiving the workflow information.

The workflow information may define the workflows, that is, works included in the workflow. For example, whether to print, copy, scan, fax, save, send, or coat a document may be defined in the workflow information. Furthermore, parameters related to printing, copying, scanning, faxing, saving, sending, or coating of the document may be defined in the workflow information. For example, the workflow information may include parameters related to a work such as a number of copies, color printing, grayscale printing, duplex printing, a fax number, a document saving location, a recipient, a destination, and authentication information for a cloud storage, but is not limited thereto. The document saving location, recipient, or destination may include a cloud storage. The authentication information may include information regarding an ID and password of a user, an authentication token, etc. The authentication token may be issued by a server through an ID and password of a user and stored in the client device. The authentication token may be issued for the image forming device and stored in the client device.

The image forming device may perform every work defined by the workflow information. Operations or works included in a workflow may be performed sequentially at the image forming device. The works to be performed sequentially in the workflow may be performed based on an output of a previous work. For example, a document may be scanned, and then the scanned document may be further copied, sent, or the like. Operations or works included in a workflow may be performed in parallel at the image forming device. For example, copying and sending of the document may be performed in parallel at the image forming device.

A user may select and use an appropriate image forming device from among a plurality of image forming devices. Accordingly, an image forming device suitable for operations to be performed by a user may be selected from among the plurality of image forming devices and used. Furthermore, a user may search for and use a public image forming device while maintaining security.

Figure 2A:
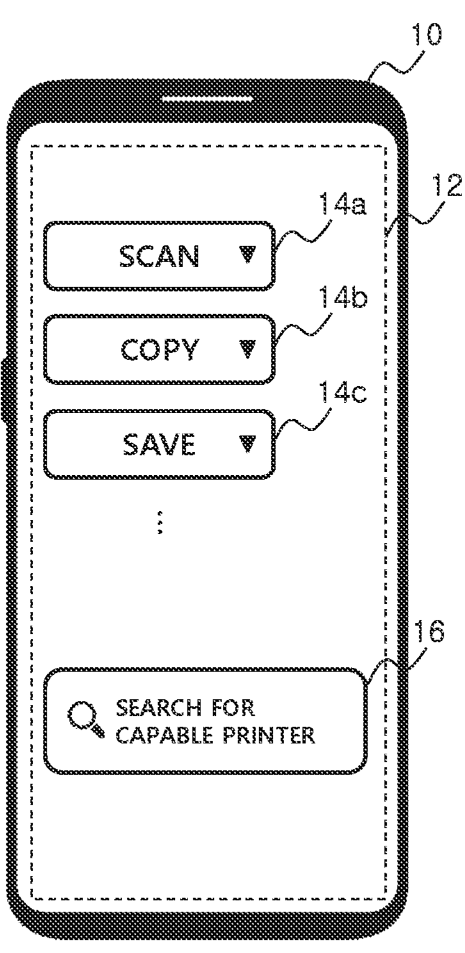
FIGS. 2A and 2B illustrate a process of searching for an image forming device at a client device according to an example.
Figure 2B:
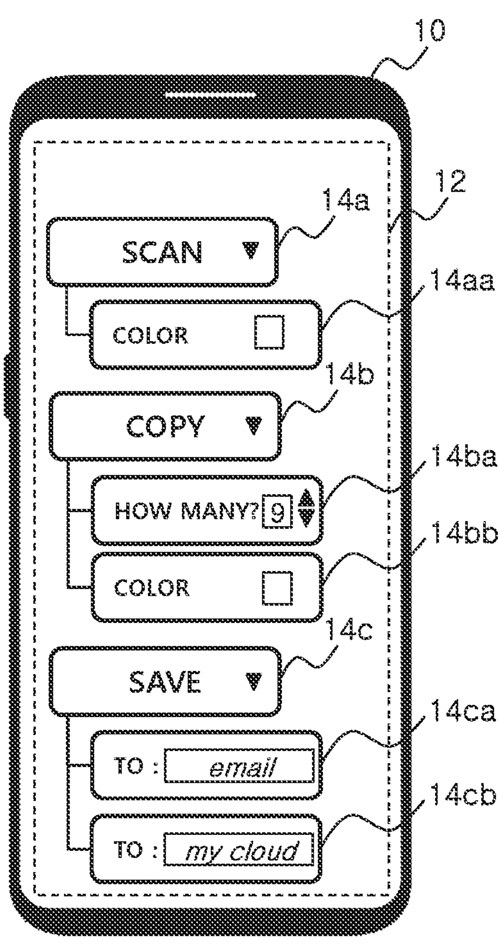

FIGS. 2A and 2B illustrate a process of searching for an image forming device at a client device according to an example.

Referring to FIGS. 2A and 2B, a client device 10 may display a graphic user interface (GUI) 12 through a user interface device.

The GUI 12 may include an interface to select works to be performed by an image forming device. The interface to select works may include a plurality of interfaces 14*a*, 14*b*, and 14*c* as shown in FIG. 2A. For example, the interface to select works may include an interface to select a printing setting, an interface 14*b* to select a copying setting, an interface 14*a* to select a scanning setting, an interface to select a faxing setting, an interface 14*c* to select a saving setting, an interface to select a coating setting, and an interface to select a deletion of workflow information, but is not limited thereto. In a case where the interface to select works is selected, an interface to select parameters related to printing, copying, scanning, faxing, saving, sending, or coating of the document may be further displayed.

Referring to FIG. 2B, in a case in which the interface 14*a* to select a scanning setting is selected, an interface 14*aa* to select a parameter related to scanning of a document may be displayed. The interface 14*aa* to select a parameter related to scanning of a document may include an interface to select a color printing, and the interface 14*aa* may provide for scanning a document in color to generate a color scanned document or for scanning a document in black-and-white to generate a black-and-white scanned document.

Referring to FIG. 2B, in a case in which the interface 14*b* to select a copying setting is selected, interfaces 14*ba* and 14*bb* to select a parameter related to copying of a document may be displayed. The interfaces 14*ba* and 14*bb* to select a parameter related to copying of a document may include an interface 14*ba* to select a number of copies and an interface 14*bb* to select a color printing.

Referring to FIG. 2B, in a case in which the interface 14*c* to select a saving setting is selected, interfaces 14*ca* and 14*cb* to select a parameter related to saving of a document may be displayed. The interfaces 14*ca* and 14*cb* to select a parameter related to saving of a document may include an interface 14*ca* to send a document by email and an interface 14*cb* to save a document in a cloud storage. A recipient or destination to receive a scanned document may be entered through the interface 14*ca* to send a document by email. A cloud storage may be selected or entered through the interface 14*cb* to save a document in a cloud storage. Access authority to access a cloud storage may be used by the image forming device to save a scanned document in the cloud storage. The image forming device may obtain the access authority to the cloud storage by authentication information included in the workflow information.

The interfaces 14*a*, 14*b*, and 14*c* to select a work or an operation may be displayed on GUI 12 with the interfaces 14*aa*, 14*ba*, 14*bb*, 14*ca*, and 14*cb* to select a parameter related to the corresponding work.

The GUI 12 may include a button 16 to initiate searching for an image forming device capable of performing works selected by a user. In a case where the button 16 is selected, the client device 10 may search for an image forming device capable of performing every work defined by the workflow information.

Figure 3:
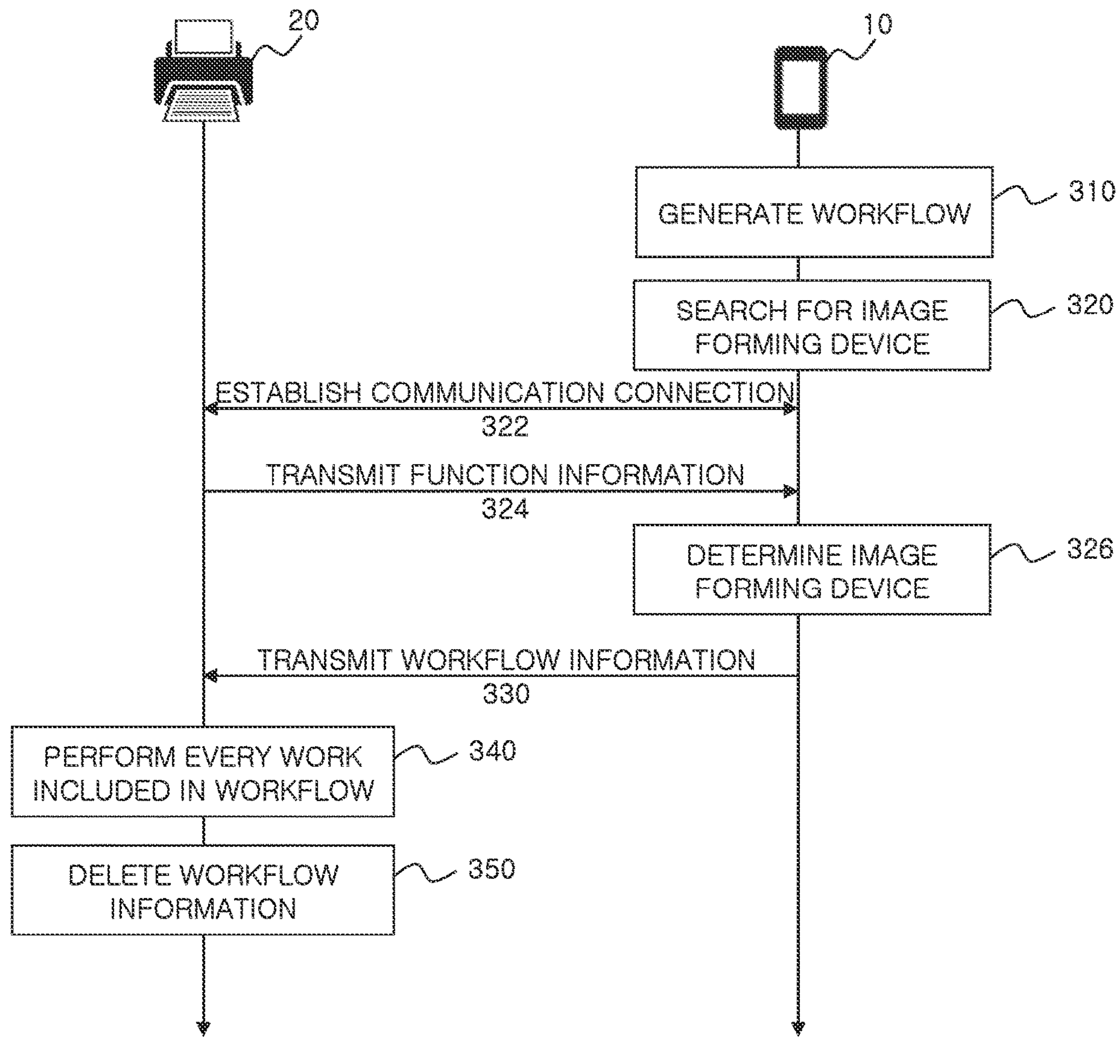
FIG. 3 is a drawing illustrating a process between a client device and an image forming device according to an example.

An example process of searching for an image forming device by the client device 10 is explained by further referring to FIG. 3.

FIG. 3 is a drawing illustrating a process between a client device and an image forming device according to an example.

At operation 310, a client device 10 may generate a workflow. The workflow may be generated based on an input received through a user interface device of the client device 10. For example, a GUI 12 of FIG. 2A may be displayed through the user interface device, and a workflow regarding works to be performed at an image forming device may be generated by a user by interacting with the GUI 12. An example of generating a workflow is described above with reference to FIGS. 2A and 2B, thus a redundant explanation is omitted. The generated workflow may be stored in the client device 10 as workflow information. The workflow information stored in the client device 10 may be reused at the client device 10 later.

At operation 320, the client device 10 may search for an image forming device 20 capable of performing every work included in the generated workflow. In an example, functions for every work included in a workflow may be defined in workflow information. Information to define functions for every work included in a workflow may be referred to as function information.

The searching for image forming device 20 may be performed simultaneously with discovery of the image forming device 20. For example, the client device 10 may detect an image forming device which broadcasts function information corresponding to the function information of the workflow information. At operation 322, a communication connection between the client device 10 and an image forming device 20 may be established. For example, a communication channel between the client device 10 and the image forming device 20 may be formed through a short-range wireless communication device of the client device 10 and the image forming device 20. At operation 324, the client device 10 may receive function information broadcasted by the image forming device 20 through the communication channel generated at operation 322. At operation 326, the client device 10 may detect an image forming device 20 which broadcasts function information matched with the function information of the workflow information.

The searching for the image forming device 20 may be performed after discovery of the image forming device 20. For example, the client device 10 may discover the image forming device 20 and then receive function information from the discovered image forming device 20. The client device 10 may detect an image forming device 20 capable of performing every work included in the workflow from among the discovered image forming devices by comparing the workflow information and the function information of the image forming devices.

At operation 322, a communication connection between the client device 10 and the image forming device 20 may be established. For example, the client device 10 and the image forming device 20 may be wirelessly connected to each other through a short-range wireless communication device of the client device 10 and the image forming device 20. For example, the client device 10 may discover an image forming device 20 based on broadcasting a signal by the short-range wireless communication device to establish a connection to the image forming device 20. A connection between one client device 10 and one image forming device 20 is established in FIG. 3, but is not limited thereto. For example, connections of one image forming device 20 to a plurality of client devices, connections of one client device 10 to a plurality of image forming devices, or connections between a plurality of client devices and a plurality of image forming devices may be established. After the short-range wireless communication connection between the client device 10 and the image forming device 20 is established, the client device 10 and the image forming device 20 may be disconnected from each other as the client device 10 and the image forming device 20 are further away from each other, and the client device 10 and the image forming device 20 may be re-connected to each other as the client device 10 and the image forming device 20 get closer. At operation 324, the image forming device 20 connected to the client device 10 may transmit function information regarding functions supported by the image forming device 20 to the client device 10.

The function information may indicate whether the image forming device 20 supports printing, copying, scanning, faxing, saving, sending, coating a document, etc.

The function information may indicate functions supported by hardware of the image forming device 20 or supported by machine readable instructions installed on the image forming device 20. For example, the function information may indicate whether the image forming device 20 supports color printing, duplex printing, connection to a cloud storage, execution of an application, etc.

The image forming device 20 connected to the client device 10 may transmit location information regarding a location of the image forming device 20 to the client device 10. The location information may include altitude information regarding an altitude of the image forming device 20. The altitude information may be detected by a sensor included in the image forming device 20, determined from map information of a network to which the image forming device 20 is connected, and the like.

At operation 326, the client device 10 may detect an image forming device 20 capable of performing every work included in a workflow. The client device 10 may detect an image forming device based on the workflow generated at operation 310. The generated workflow may be stored in the client device 10 as workflow information, and the client device 10 may detect an image forming device based on the workflow information. As described above, connections between one client device 10 and a plurality of image forming devices may be established, and the client device 10 may detect, based on function information received from the plurality of image forming devices and workflow information generated at the client device 10, an image forming device capable of performing every work included in the workflow information.

The client device 10 may display a result of searching for an image forming device by operations 320, 322, 324, and 326 on a user interface device of the client device 10, an example of which will be explained later by referring to FIG. 4.

At operation 330, the client device 10 may transmit workflow information to one image forming device 20 of image forming devices found by the searching. The workflow information may be generated and stored in the client device 10 based on a user input at operation 310, but is not limited thereto. For example, the workflow information may be generated based on a user input at the client device 10 and stored in a server to which the client device 10 is connected. The image forming device 20 may store the received workflow information. The image forming device 20 may display a list of stored workflows through a user interface device of the image forming device 20. In that case, a user of the image forming device 20 may select a workflow in the displayed list to cause the image forming device 20 to perform works defined by the selected workflow. Repeated works related to the image forming device 20 may be conveniently performed by selecting a workflow displayed on the image forming device 20. In an example, a password may be set for a workflow stored in the image forming device 20. For example, a user may generate a workflow through his client device 10 and set a password to run the workflow. In that case, a password is needed to run the workflow on the image forming device 20, thereby, improving security and privacy of users.

At operation 340, the client device 10 may perform works included in the workflow and defined by the workflow information received from the client device 10. The image forming device 20 may sequentially perform works included in the workflow, but is not limited thereto. For example, the image forming device 20 may perform operations in parallel, such as creating a copy of a scanned document and saving the scanned document. The workflow may include a work to upload a document to a cloud storage, and the workflow information may include authentication information for the cloud storage of the client device 10 or a user of the client device 10. The authentication information may include information regarding an ID and password of a user, an authentication token, or the like. The authentication token may be issued by a server through an ID and password of a user and stored in the client device 10. The authentication token may be issued for the image forming device 20 and stored in the client device 10.

At operation 350, the image forming device 20 may delete the workflow information received from the client device 10. In a case where the image forming device 20 is used by a plurality of users and their authentication information remains in the image forming device 20, the security and privacy of the users may be threatened. A process performed at the client device 10 may be performed through an application installed on the client device 10. The client device 10 may communicate with an image forming device and a server 30 (e.g., see FIGS. 6 and 7) through an application. The workflow information may be deleted based on a characteristic of a user who generated the workflow. For example, in a case in which a user of the client device 10 is a guest user of the application, the workflow information generated by the guest user may be deleted from the image forming device 20. For example, in a case in which a user of the client device 10 is a registered user of the application, the workflow information may be stored in the image forming device 20 and deleted according to the registered user's selection. An example of deletion of the workflow information will be explained later by referring to FIGS. 8 and 9.

The image forming device 20 may delete the workflow information received from the client device 10 after the completion of works, so a user may use a public image forming device 20 with improving the security and privacy. The deletion of the workflow in the image forming device 20 may be performed according to a user's selection after the completion of works, an example of which will be explained later by referring to FIGS. 8 and 9.

The workflow information may include parameters related to a work such as the number of copies, color printing, grayscale printing, duplex printing, a fax number, a document saving location, a recipient, a destination, and user authentication information for a cloud storage, but is not limited thereto.

Figure 4:
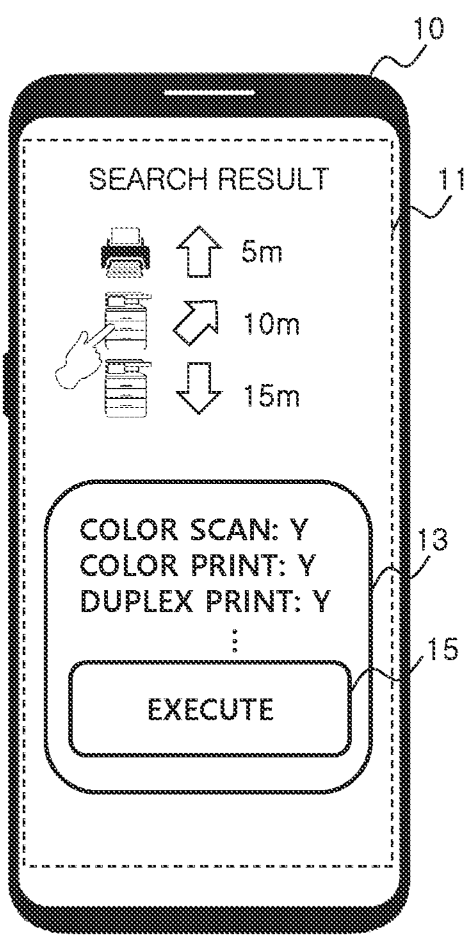
FIG. 4 is a drawing illustrating a process of a client device causing an image forming device to perform a work according to an example.

FIG. 4 is a drawing illustrating a process of a client device causing an image forming device to perform an operation according to an example.

As shown in FIG. 4, a button 15 to cause a selected image forming device to perform works included in workflow information may be displayed on a user interface device of the client device 10, but is not limited thereto. For example, an interface to confirm performing works may be displayed on the selected image forming device based on the workflow information, and every work included in the workflow may be performed at the image forming device in response to selecting the interface.

Referring to FIG. 4, the client device 10 may display a result interface 11 of searching for an image forming device on a user interface device of the client device 10. The result interface 11 may display information regarding found image forming devices. The information regarding the found image forming devices may be displayed based on a location of the image forming device. For example, the result interface 11 may display information regarding a location of the found image forming devices. As shown in FIG. 4, the information regarding the location of the found image forming devices may include information regarding a distance between the client device 10 and the found image forming device, an orientation from the client device 10 to the found image forming device, and the like. The information regarding the location of the found image forming devices is not limited thereto. For example, the information regarding the location of the found image forming devices may include information regarding an altitude of the image forming devices. Accordingly, an image forming device which is located on the same floor with the client device 10 may be found. Furthermore, an image forming device capable of performing every work defined by the workflow information may be found from among image forming devices located on the same floor with the client device 10.

The result interface 11 may display function information 13 regarding functions supported by a found image forming device. The function information 13 of an image forming device selected by a user from among found image forming devices may be displayed as shown in FIG. 4. In an example, function information of a plurality of image forming devices may be displayed with their location information. The function information 13 may indicate whether the image forming device supports printing, copying, scanning, faxing, saving, sending, or coating a document. The function information may indicate functions supported by hardware of the image forming device or supported by machine readable instructions installed on the image forming device. For example, the function information may indicate whether the found image forming device supports color printing, duplex printing, connection to a cloud storage, execution of an application, etc.

FIG. 4 illustrates an example in which the search result interface 11 includes three image forming devices capable of performing works defined in the workflow information. In the example of FIG. 4, the three image forming devices are sorted by a distance from the client device 10. However, the result interface 11 may be sorted by various criterions. For example, an image forming device capable of performing the most works among works included in the workflow information may be ranked first and shown at the top in the search result interface 11. In an example, the result interface 11 may display a matching rate between functions supported by an image forming device and works included in the workflow information.

Referring to FIG. 4, the search result interface 11 may include a button 15 to cause a selected image forming device to perform works included in the workflow information. The client device 10 may transmit the workflow information to the selected image forming device in response to a selection of the button 15. The selected image forming device may perform works included in the workflow information based on the received workflow information. The selected image forming device may automatically perform works included in the workflow information based on the received workflow information, but is not limited thereto. For example, the selected image forming device may perform works included in the workflow information in response to receiving a user's confirmation through a user interface device of the image forming device.

Figure 5:
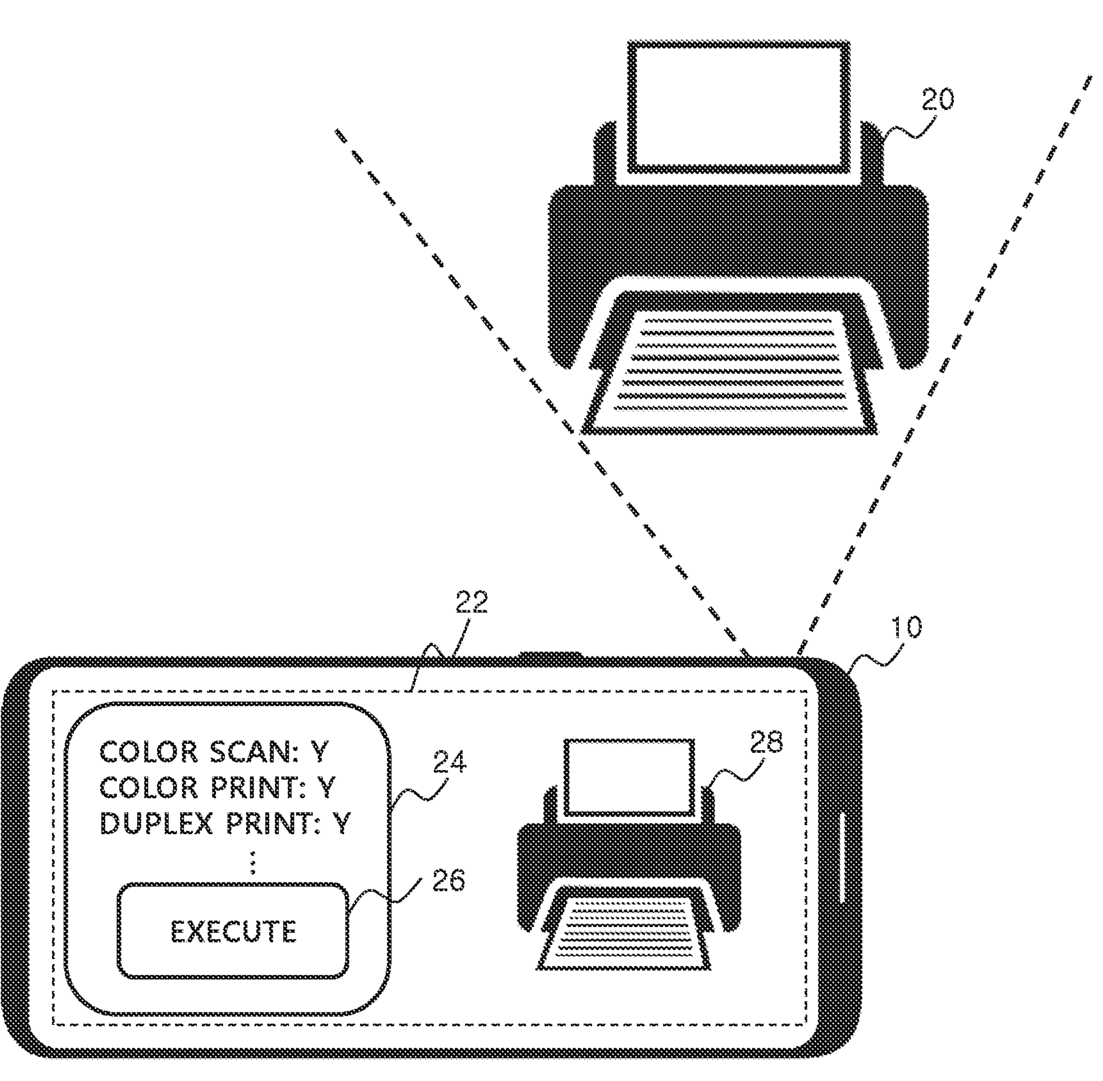
FIG. 5 is a drawing illustrating a process of causing an image forming device captured by a client device to perform a work according to an example.

FIG. 5 is a drawing illustrating a process of causing an image forming device captured by a client device to perform an operation according to an example.

It may be difficult for a user in an office to identify a found image forming device or a selected image forming device in a case where a plurality of image forming devices are located in the office. Accordingly, the client device 10 may capture an image forming device 20 through a camera, and analyze the captured image 22 to identify an object corresponding to the found or selected image forming device. The image analysis may be performed by various technologies.

The client device 10 may display, based on the function information and the location information of an image forming device 20, an interface 24 to present functions supported by the image forming device 20 on the image displayed on the client device 10 in a case where an object corresponding to the image forming device 20 is identified in the image. The image 22 may be captured by a camera of the client device 10 in real-time and displayed on a user interface device of the client device 10. In an example, the interface 24 to present functions supported by the image forming device 20 may be overlaid on an object 28 corresponding to the image forming device 20 in the image 22.

Referring to FIG. 5, a button 26 to cause the image forming device 20 identified in the image 22 to perform works included in the workflow information may be overlaid on the image 22. The client device 10 may transmit the workflow information to the image forming device in response to a selection of the button 26. The image forming device 20 may perform works included in the workflow information based on the received workflow information. The image forming device 20 may automatically perform works defined by the workflow information based on the received workflow information, but is not limited thereto. For example, the image forming device 20 may perform works included in the workflow information in response to receiving a user's confirmation through a user interface device of the image forming device, an example of which will be explained later by referring to FIGS. 8 and 9.

FIG. 3 illustrates an example in which a client device receives function information from image forming devices and searches for an image forming device. In another example, FIGS. 6 and 7 illustrate that a communication between a server 30 and an image forming device 20 is established to search for an image forming device 20.

Figure 6:
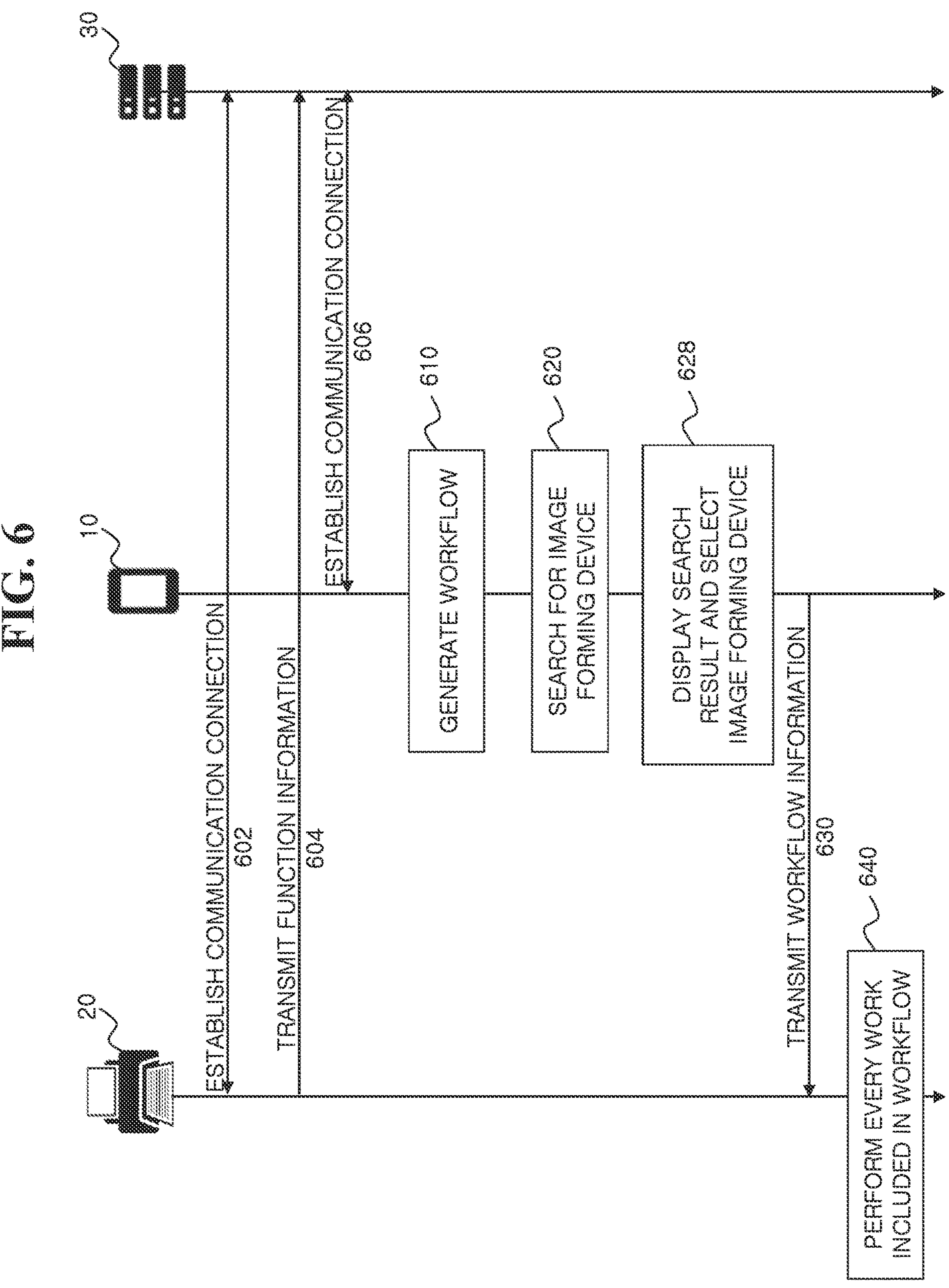
FIG. 6 is a flowchart illustrating a process of a client device, an image forming device, and a server according to an example.

FIG. 6 is a flowchart illustrating a process of a client device, an image forming device, and a server according to an example.

At operation 602, a communication connection between an image forming device 20 and a server 30 may be established. At operation 604, the image forming device 20 may transmit function information regarding functions supported by the image forming device 20 to the server 30. The image forming device 20 may transmit location information regarding a location of the image forming device 20 to the server 30. The location information may include altitude information regarding an altitude of the image forming device 20.

The server 30 may register the image forming device 20 to the server 30 based on the function information.

FIG. 6 illustrates an example in which a connection between one server 30 and one image forming device 20 is established. However, the examples are not so limited. For example, connections between one server 30 and a plurality of image forming devices may be established.

At operation 606, a connection between a client device 10 and the server 30 may be established. User registration information of a user of the client device 10 may be used for the connection between a client device 10 and the server 30, but is not limited thereto. The server 30 may be used by a registered user as well as an unregistered user such as a guest user. A process performed at the client device 10 may be performed through an application installed on the client device 10. The client device 10 may communicate with the image forming device 20 and the server 30 through an application. A user registered to the server 30 may use an ID and password registered to the server 30 to use the application, and may be referred to as a registered user of the application. A user unregistered to the server 30 may be referred to as a guest user of the application.

User registration information may include an ID and password of a user as user authentication information for the server 30 to authenticate the user. The user may use his user identification information to request a user registration to the server 30. After the user registration is completed in the server 30, the user may log in to the server 30 by using the user registration information to establish a connection between the client device 10 and the server 30. A connection between the client device 10 and the server 30 may be performed through a portal operated by the server 30. Information may be communicated between the client device 10 and the server 30 through the portal.

At operation 610, the client device 10 may generate a workflow based on an input received through a user interface device of the client device 10. Operation 610 is substantially identical to operation 110 of FIG. 1 and operation 310 of FIG. 3, and a redundant description will be omitted.

At operation 620, the client device 10 may search for an image forming device capable of performing every work included in the workflow. The server 30 may transmit function information of the image forming device 20 to the client device 10. The server 30 may transmit function information of the image forming device 20 to the client device 10 based on a location of the client device 10. For example, the server 30 may transmit, to the client device, function information of an image forming device 20 which is located on the same floor with the client device 10. The server 30 may receive location information regarding a location of the client device from the client device 10. The location information may include altitude information regarding an altitude of the client device 10. The altitude information of the client device 10 may be detected by a sensor included in client device 10, detected from map information of a network to which client device 10 is connected, and the like.

The client device 10 may detect an image forming device 20 capable of performing every work included in the workflow based on the workflow information generated by the client device 10 and the function information received from the server 30. The client device 10 may detect an image forming device 20 capable of performing every work included in the workflow by comparing the function information of the image forming device received from the server 30 and function information included in the workflow information.

At operation 628, the client device 10 may display a result of searching for an image forming device through a user interface, and one image forming device may be selected in the result through the user interface. An example of operation 628 is explained above by referring to FIGS. 4 and 5, and a redundant description will be omitted.

Operations 630 and 640 are substantially identical to operations 330 and 340, and a redundant description will be omitted.

The selected image forming device 20 may perform works defined by the workflow information and delete the workflow information after the completion of the workflow.

FIG. 7 is a flowchart illustrating a process of a server searching for an image forming device according to an example.

Operations 702, 704, and 706 are substantially identical to operations 602, 604, and 606, and a redundant description will be omitted.

At operation 710, the client device 10 may generate a workflow based on an input received through a user interface device of the client device 10. Operation 710 is substantially identical to operation 110 of FIG. 1 and operation 310 of FIG. 3, and a redundant description will be omitted.

At operation 721, the client device 10 may transmit the workflow information regarding the generated workflow to the server 30. The generated workflow may be stored in the client device 10, and also may be stored or backed up in the server 30.

At operation 723, the client device 10 may transmit a search request for an image forming device to the server 30. The search request may be transmitted from the client device 10 to the server 30 with the workflow information in operation 723. Operations 721 and 723 may be performed simultaneously. At operation 725, the server 30 may search for an image forming device 20 capable of performing works included in the workflow information based on the workflow information received from the client device 10 and the function information received from the image forming device 20. For example, the server 30 may detect an image forming device 20 capable of performing every work included in the workflow by comparing the function information of the image forming device 20 and function information included in the workflow information.

The server 30 may store location information regarding locations of the client device 10 and the image forming device 20. The location information may include altitude information. The server 30 may search for an image forming device capable of performing works included in the workflow information from among image forming devices within a predetermined distance from the client device 10 based on the location information. For example, the server 30 may perform a search of image forming devices located on the same floor with the client device 10.

At operation 727, the server 30 may transmit to the client device 10 a result of searching for an image forming device.

At operation 728, the client device 10 may display a result of searching for an image forming device through a user interface, and one image forming device 20 may be selected from the result through the user interface. An example of operation 728 is explained above by referring to FIGS. 4 and 5, and a redundant description will be omitted.

At operation 732, the client device 10 may transmit a result of a selection to the server 30. The result of the selection may include selecting one image forming device 20 from among found image forming devices.

At operation 734, the server 30 may transmit the workflow information to the image forming device 20 selected by the client device 10 based on the result of the selection of the client device 10.

At operation 740, the selected image forming device 20 may perform works defined by the workflow information and delete the workflow information after the completion of the workflow.

A process performed at the client device 10 may be performed through an application installed on the client device 10. The client device 10 may communicate with the image forming device and the server 30 through an application.

The image forming device 20 may save the received workflow information based on a characteristic of a user who generated the workflow. For example, in a case in which a user of the client device 10 is a guest user of the server 30 or application, the workflow information generated by the guest user may be deleted from the image forming device 20. For example, in a case in which a user of the client device 10 is a registered user of the server 30 or the application, the workflow information may be stored in the image forming device 20 and deleted according to the registered user's selection. An example of deletion of the workflow information will be explained later by referring to FIGS. 8 and 9.

The image forming device 20 may display a list of stored workflows through a user interface device of the image forming device 20. In that case, users of the image forming device 20 may select a workflow in the displayed list to cause the image forming device 20 to perform works defined by the workflow. Repeated works related to the image forming device 20 may be conveniently performed by selecting a workflow displayed on the image forming device 20.

The image forming device 20 may automatically perform works defined by the workflow information based on the received workflow information, but is not limited thereto. For example, the image forming device 20 may perform works included in the workflow information in response to receiving a user's confirmation to execute the workflow through a user interface device of the image forming device, an example of which is explained by referring to FIGS. 8 and 9.

Figure 8:
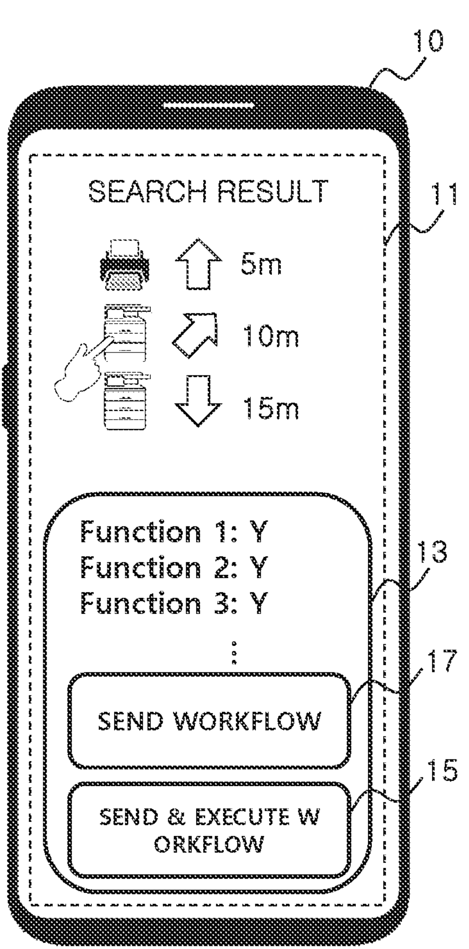
FIG. 8 is a drawing illustrating a process of a client device causing an image forming device to perform a work according to an example.

FIG. 8 is a drawing illustrating a process of a client device causing an image forming device to perform a work according to an example.

Figure 9:
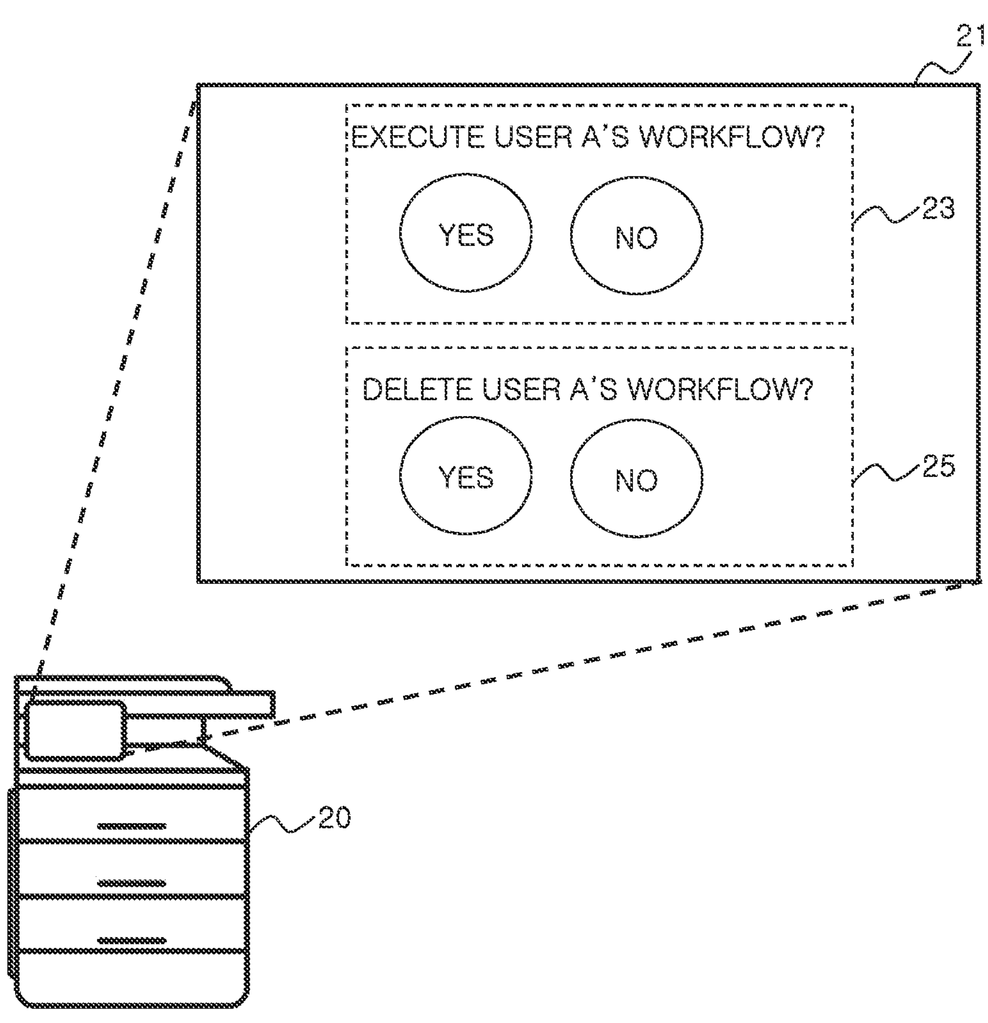
FIG. 9 is a drawing illustrating a graphic user interface displayed on a user interface device of an image forming device according to an example.

FIG. 9 is a drawing illustrating a graphic user interface displayed on a user interface device of an image forming device according to an example.

Referring to FIGS. 8 and 9, the search result interface 11 may include a button 17 to cause a selected image forming device 20 to prepare works included in the workflow information. The client device 10 may transmit the workflow information to the selected image forming device in response to a selection of the button 17. The image forming device 20 may display a GUI 21 through a user interface device of the image forming device 20, and the GUI 21 may include an interface for a user's confirmation on execution of works included in the workflow. The image forming device 20 may perform works included in the workflow in response to receiving the user's confirmation through an interface 23.

Referring to FIGS. 8 and 9, the search result interface 11 may include a button 15 to cause a selected image forming device 20 to perform works included in the workflow information. The client device 10 may transmit the workflow information to the selected image forming device 20 in response to a selection of the button 15, and the image forming device 20 may perform works included in the workflow in response to receiving the workflow information.

Referring to FIG. 9, the GUI 21 of the image forming device 20 may include an interface 25 to delete workflow information of a user. The image forming device 20 may delete the workflow information in response to receiving deletion of the workflow through the interface 25 after all of the works are performed.

Figure 10:
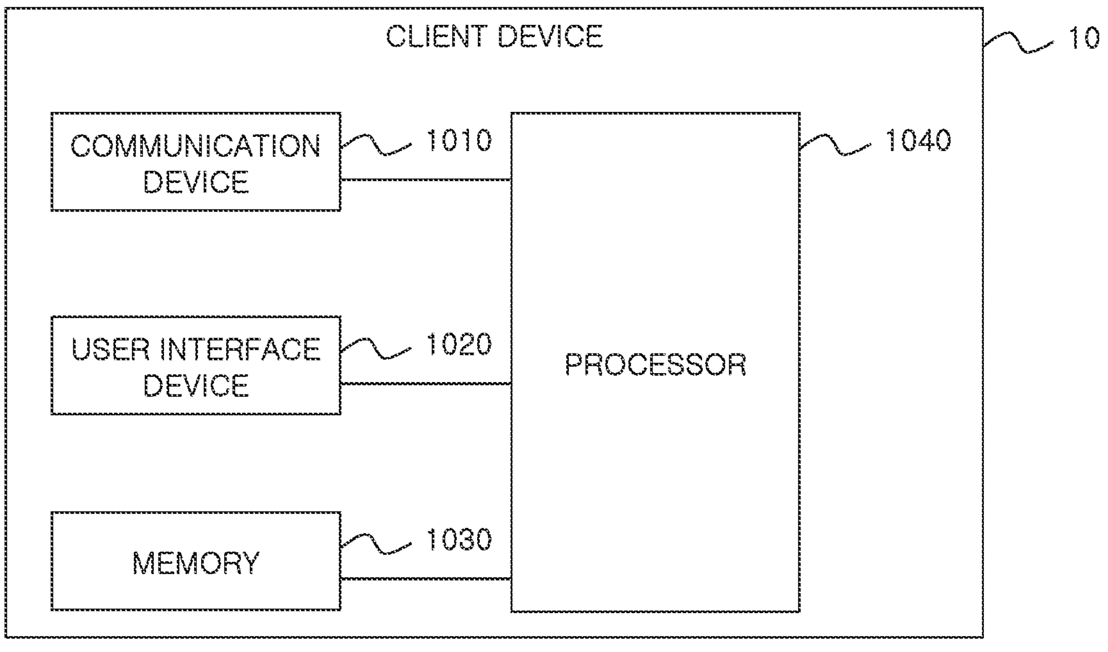
FIG. 10 is a block diagram of a client device according to an example.

FIG. 10 is a block diagram of a client device according to an example.

Referring to FIG. 10, the client device 10 may include a communication device 1010, a user interface device 1020, a memory 1030, and a processor 1040. However, the client device 10 may be realized by more or fewer components than the illustrated components.

The communication device 1010 may communicate with an external apparatus. As an example, the communication device 1010 may be connected to a network in a wired or wireless manner and communicate with the external device. The external device may be another client device, an image forming device 20, or a server 30, but is not limited thereto.

The communication device 1010 may include a communication module that supports one of various wired/wireless communication methods. For example, the communication module may be of a chipset type or may be a sticker/barcode (e.g., a sticker including a near field communication (NFC) tag) including information for communication. Also, the communication module may be a short range communication module, a wired communication module, and the like.

For example, the communication device 1010 may support at least one of Wireless LAN, Wireless Fidelity (Wi-Fi), Wi-Fi Direct (WFD), Bluetooth, Bluetooth Low Energy (BLE), Wired Lan, Near Field Communication (NFC), Zigbee, infrared Data Association (IrDA), 3G, 4G, 5G, and the like.

The user interface device 1020 may include an input unit to receive, from the user, an input to control an operation of the client device 10 and an output unit to display a result according to the operation of the client device 10 or information regarding a state of the client device 10. For example, the user interface device 1020 may include a manipulation panel to receive a user input, a display panel to display a screen, etc.

As an example, the input unit may include at least one device to receive various types of user inputs, such as a keyboard, a physical button, a touchscreen, a camera, a microphone, and the like. Also, the output unit may include, for example, a display panel, a speaker, and the like, but is not limited thereto. For example, the user interface device 1020 may include a device that supports various inputs and outputs.

The memory 1030 may store machine readable instructions or a program. For example, the memory 1030 may store instructions to display service information about a service associated with an image forming device, receive user identification information about another user to transmit the user identification information to the server, and the like.

The memory 1030 may include at least one of a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), a programmable ROM (PROM), an electrically erasable PROM (EEPROM), a magnetic memory, a magnetic disk, an optical disc, or the like.

The processor 1040 may control an operation of the client device 10 and may include at least one processor such as a Central Processing Unit (CPU). The processor 1040 may include at least one processor peculiar to each function or one integrated processor.

The processor 1040 may execute a program stored in the memory 1030, read data or a file stored in the memory 1030, or store new data or a file in the memory 1030. The processor 1040 may perform various example operations explained herein by executing a program or instructions stored in the memory 1030, and a redundant explanation will be omitted.

Figure 11:
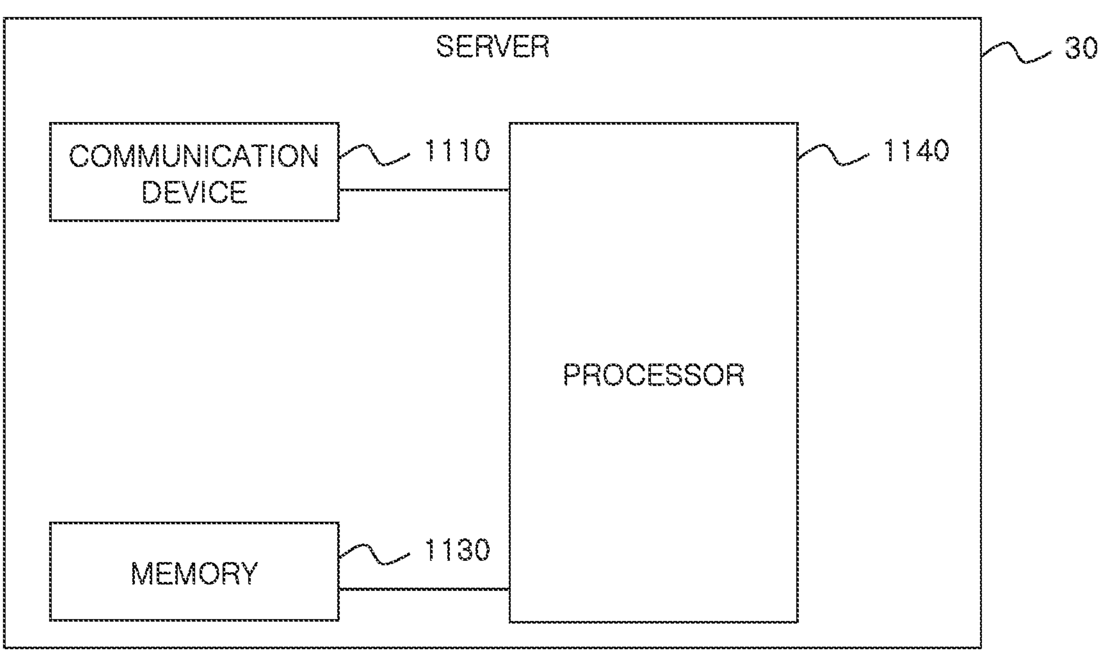
FIG. 11 is a block diagram of a server according to an example.

FIG. 11 is a block diagram of a server according to an example.

As shown in FIG. 11, the server 30 may include a communication device 1110, a memory 1130, and a processor 1140. However, the server 30 may be realized by more or fewer components than the illustrated components.

The communication device 1110 may communicate with an external apparatus. As an example, the communication device 1110 may be connected to a network in a wired or wireless manner and communicate with the external apparatus. The external apparatus may be the client device 10 or the image forming device 20, but is not limited thereto.

The memory 1130 may store machine readable instructions or a program. For example, the memory 1130 may store instructions to perform user registration and device registration based on obtained user registration information of a user and device identification information of an image forming device, to provide the user with a service associated with the image forming device, to receive from the user identification information of another user to transmit a service invitation to the other user, and to provide the other user, who accepts the service invitation, with the service.

The processor 1140 may execute a program stored in the memory 1130, read data or a file stored in the memory 1130, or store new data or a file in the memory 1130. The processor 1140 may perform various example operations explained herein by executing a program or instructions stored in the memory 1130, and a redundant explanation will be omitted.

Figure 12:
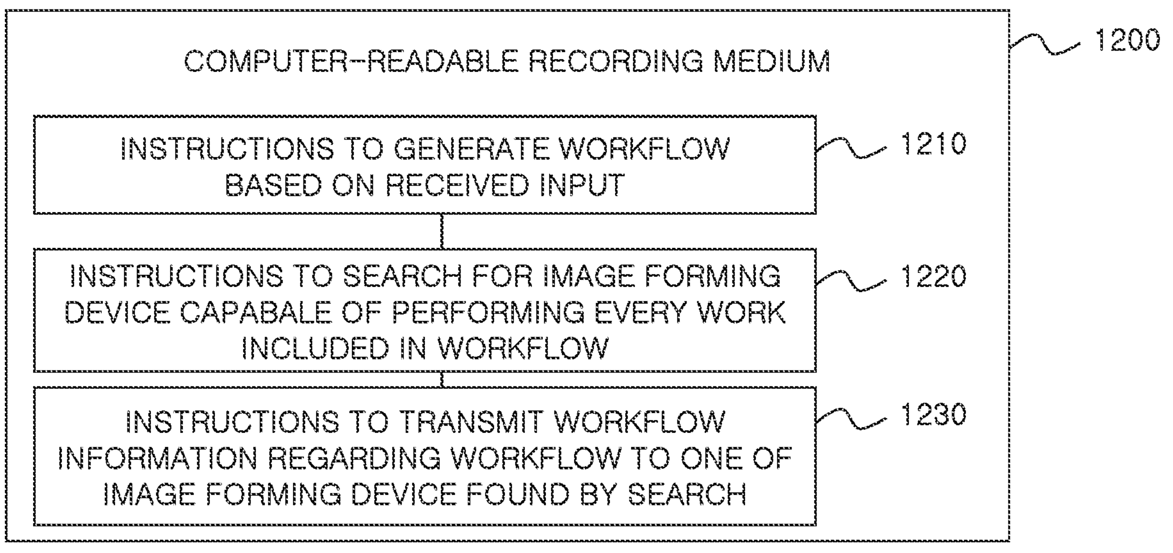
FIG. 12 is a diagram illustrating instructions stored on a non-transitory computer-readable storage medium according to an example.

FIG. 12 is a diagram illustrating instructions stored in a non-transitory computer-readable storage medium according to an example.

As shown in FIG. 12, a non-transitory computer-readable storage medium 1200 includes instructions 1210 to generate a workflow based on a received input, instructions 1220 to search for an image forming device capable of performing every work included in the workflow, and instructions 1230 to transmit workflow information regarding the workflow to one of the found image forming device, but is not limited thereto. The non-transitory computer-readable storage medium 1200 may store more or fewer instructions than the instructions illustrated in FIG. 12.

Other functions of the instructions are substantially the same as those described above, and redundant descriptions are omitted.

Figure 13:
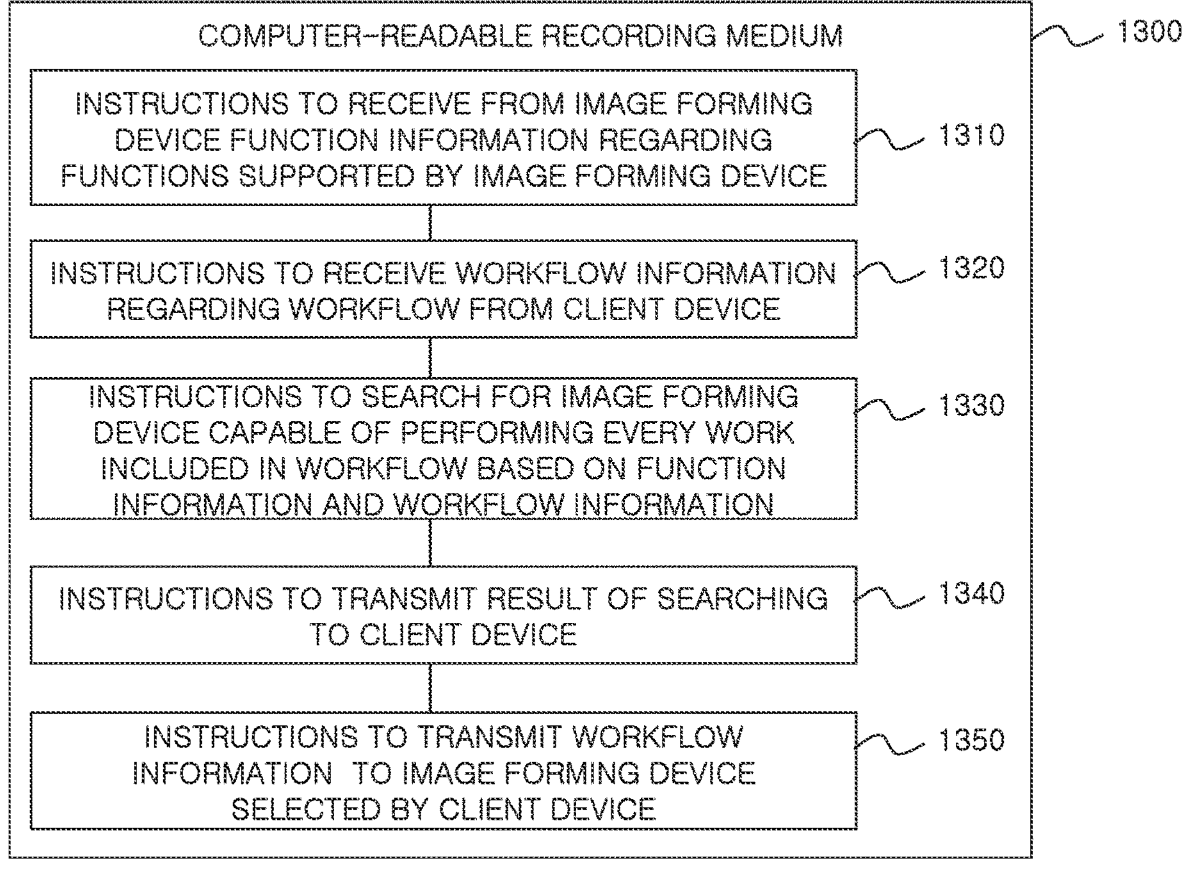
FIG. 13 is a diagram illustrating instructions stored on a non-transitory computer-readable storage medium according to an example.

FIG. 13 is a diagram illustrating instructions stored in a non-transitory computer-readable storage medium according to an example.

As shown in FIG. 13, a non-transitory computer-readable storage medium 1300 may include instructions 1310 to receive function information regarding functions supported by an image forming device from the image forming device, instructions 1320 to receive workflow information regarding a workflow from a client device, instructions 1330 to search for an image forming device based on the function information and the workflow information, instructions 1340 to transmit a result of the searching to the client device, and instructions 1350 to transmit the workflow information to an image forming device selected by the client device from among the found image forming devices, but is not limited thereto. The non-transitory computer-readable storage medium 1300 may store more or fewer instructions than the instructions illustrated in FIG. 13. Other functions of the instructions are substantially the same as those described above, and redundant descriptions are omitted.

Example operation methods of the client device 10, the image forming device 20, or the server 30 may be realized as a non-transitory computer-readable recording medium storing therein a command or data executable by a computer or a processor. The above-described example operation method may be implemented in the form of a non-transitory computer-readable storage medium to store instructions or data executable by a computer or a processor. The above-described example operation method of the image forming device may be written in a program executable by a computer, and may be implemented in a general-purpose digital computer that operates such a program using a non-transitory computer-readable storage medium. Examples of such a non-transitory computer-readable storage medium may include read-only memory (ROM), random-access memory (RAM), flash memory, compact disc (CD)-ROMs, CD-recordables (Rs), CD+Rs, CD-rewritable (RWs), CD+RWs, and digital versatile disc (DVD)-ROMs, DVD-Rs, DVD+Rs, DVD-RWs, DVD+RWs, DVD-RAMs, blu-ray disc (BD)-ROMs, BD-Rs, BD-recordable low to highs (R LTHs), BD-REs, magnetic tapes, floppy disks, magneto-optical data storage devices, optical data storage devices, hard disks, solid-state disks (SSDs), and any device capable of storing machine readable instructions, associated data, data files, and data structures, and providing a processor or computer with machine readable instructions, associated data, data files, and data structures such that the processor or computer may execute the instructions.

While various examples are explained with reference to accompanying drawings, the example may be modified and changed from the disclosure. For example, the techniques described may be performed in a different order than the described methods, and/or the described systems, structures, devices, circuits, or any components may be integrated or combined in a different form than the described methods, or may be replaced or substituted by other components or their equivalents, in order to achieve an appropriate result.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A method performed at a client device, the method comprising:

generating a workflow comprising a plurality of works based on an input received through a user interface device of the client device;

searching for an image forming device capable of performing every work included in the workflow, wherein the searching comprises receiving function information regarding functions supported by at least one image forming device, and detecting, based on the workflow information and the function information, an image forming device capable of performing every work included in the workflow; and transmitting workflow information regarding the workflow to one image forming device of image forming devices found by the searching.

2. The method of claim 1, wherein the searching comprises:

wirelessly connecting to an image forming device through a short-range communication device of the client device;

receiving, from the connected image forming device, function information regarding functions supported by the connected image forming device; and detecting, based on the workflow information and the function information, an image forming device capable of performing every work included in the workflow.

3. The method of claim 2, further comprising overlaying, on an image of the connected image forming device displayed through the user interface device, a graphic representation to indicate functions supported by the connected image forming device.

4. The method of claim 3, further comprising capturing the image of the connected image forming device by a camera of the client device and displaying the captured image through the user interface device.

5. The method of claim 1, wherein the searching comprises: establishing a connection to a server through a communication device of the client device;

receiving, from the server, function information regarding functions supported by at least one image forming device registered on the server; and detecting, based on the workflow information and the function information, an image forming device capable of performing every work included in the workflow.

6. The method of claim 5, further comprising:

transmitting location information regarding a location of the client device to the server, wherein the receiving of the function information comprises receiving, from the server, the function information regarding the functions supported by the at least one image forming device which is registered on the server and located within a predetermined range from the location of the client device.

7. The method of claim 5, further comprising:

displaying a result of the searching on the user interface device based on locations of the client device and the at least one image forming device, and the function information; and receiving a selection of the one image forming device from the result of the searching, wherein the transmitting of the workflow information comprises transmitting the workflow information to the one image forming device selected from the result of the searching.

8. The method of claim 5, wherein the workflow information is transmitted to the one image forming device through the server.

9. The method of claim 1, wherein the workflow comprises at least one of scanning, copying, printing, uploading to a cloud storage, or sending by email.

10. The method of claim 1, wherein the workflow information comprises user authentication information of the client device for a cloud storage.

11. The method of claim 1, wherein the workflow comprises deleting the workflow information at the one image forming device.

12. The method of claim 1, wherein the functions comprise at least one of color printing, automatic duplex printing, using a cloud storage, or running an application.

13. The method of claim 12, wherein, based on the workflow comprising uploading a document to the cloud storage, the workflow information comprises user authentication information of the client device for the cloud storage, and the searching comprises searching for an image forming device capable of connecting to the cloud storage based on the workflow information and the function information.

14. A method performed at a server, the method comprising:

receiving, from a plurality of image forming devices, function information regarding functions respectively supported by the plurality of image forming devices:

receiving workflow information regarding a workflow comprising a plurality of works from a client device; searching for an image forming device capable of performing every work included in the workflow based on the function information and the workflow information; and transmitting a result of the searching to the client device and transmitting the workflow information to one image forming device, selected by the client device, among image forming devices found by the searching.

15. A non-transitory computer-readable storage medium storing instructions executable by a client device processor, the computer-readable storage medium comprising:

instructions to generate a workflow comprising a plurality of works based on an input received through a user interface device of the client device;

instructions to search for an image forming device capable of performing every work included in the workflow, wherein the instructions to search comprise instructions to receive function information regarding functions supported by at least one image forming device, and instructions to detect, based on the workflow information and the function information. an image forming device capable of performing every work included in the workflow; and instructions to transmit workflow information regarding the workflow to one image forming device of image forming devices found by the searching.

* * * * *